United States Patent [19]
Porath et al.

[11] 3,853,708

[45] Dec. 10, 1974

[54] COUPLING BIOLOGICALLY ACTIVE SUBSTANCES TO OXIRANE-CONTAINING POLYMERS

[75] Inventors: Jerker Olof Porath; Nermin Fornstedt; Lars Sundberg; Conny Eklund, all of Uppsala; Rolf Axen, Upplands Balinge, all of Sweden

[73] Assignee: Exploaterings Aktiebolaget T.B.F., Uppsala, Sweden

[22] Filed: Jan. 14, 1974

[21] Appl. No.: 433,245

Related U.S. Application Data

[63] Continuation-in-part of Ser. No. 106,548, Jan. 14, 1971, abandoned.

[30] Foreign Application Priority Data

Jan. 23, 1970  Sweden.................................. 843/70

[52] U.S. Cl................ 195/68, 195/63, 195/DIG. 11
[51] Int. Cl............................................... C07g 7/02
[58] Field of Search................. 195/63, 68, DIG. 11; 106/548

[56]  References Cited
UNITED STATES PATENTS

| | | | |
|---|---|---|---|
| 3,282,702 | 11/1966 | Schreiner........................... | 195/63 X |
| 3,645,852 | 2/1972 | Axen et al. ........................ | 195/63 X |

OTHER PUBLICATIONS

Malanorskii, M. S., Epoxides and Their Derivatives, Daniel Darey & Co., Inc., N.Y., 1965, (pp. 29, 33, 39, 40, 94, 95, 96, and 156), QD305tf7M25.

*Primary Examiner*—David M. Naff
*Attorney, Agent, or Firm*—Young & Thompson

[57]  ABSTRACT

Biologically active substances such as an enzyme or enzyme inhibitor are coupled to polymers in which epoxide groups have been introduced by reacting the polymer with a epihalohydrin or a bisoxirane.

9 Claims, No Drawings

COUPLING BIOLOGICALLY ACTIVE SUBSTANCES TO OXIRANE-CONTAINING POLYMERS

This application is a continuation-in-part of our copending application Ser. No. 106,548, filed Jan. 14, 1971 and now abandoned.

Proteins, nucleins and their hydrolysis products, amino acids, peptides and nucleotides as well as a large number of other substances present in living cells, in body fluids or in vegetable saps can be classified as amphoteric electrolytes containing both basic and acidic functional groups. Belonging to these biologically active substances are enzymes, hormones and other biological regulators and metabolites.

In live cells, enzymes catalyze depolymerization of biological macromolecules, ester- and amide hydrolysis, biochemical oxidations and reductions, hydration and dehydration of the compound etc. In certain cases, these reactions can be accomplished only with great difficulty, or most often not at all, by common organo-chemical methods. Therefore, it is exceedingly important to also be able to rationally utilize technically the properties of the enzymes.

Enzymes are very expensive and unstable. Therefore, it is of great value to be able to bind the enzyme to an insoluble carrier polymer in such a way that it can be easily recovered. In this way, it would be possible to use the thereby insolubilized, granulated enzyme-polymer in reactor beds.

Enzymes and other proteins coupled to a polymer substance which is chemically resistant but which can swell in water can also be used to specifically adsorb substances that form reversible complexes with the coupled protein. This principle can, of course, also be used for other systems, e.g. peptides, nucleic acids and other substances with the ability to form reversible complexes. By varying the molecular weight, degree of cross-linking, etc. of the polymer, different degrees of hardness, swelling properties, etc. can be obtained to suit different purposes. In this way, varying distances are obtained between the active groups. However, one can go to the extreme limiting case and couple the enzymes, or other biologically active substances to soluble polymers and thereby have the possibility of batchwise or continuous reactions with different paths of circulation. For example, the polymer solution can circulate continuously between the adsorption and elution stages in a dialyzer with several cells.

It is important that the biologically interesting substance, e.g., enzyme, is anchored to the polymer under as mild conditions as possible, and so that the original activity properties are maximally retained or possibly improved. Since the substances in this connection are so dissimilar in stability and reactivity, it is necessary to have access to and be able to select from a number of different coupling methods. The most favourable, and most suitable for the purpose, coupling method can be chosen for each particular active substance.

The invention relates to a method for chemically coupling biologically active substances, namely, enzymes and proteinaceous enzyme inhibitors, to an oxirane-containing polymer. The chemical coupling reaction is effected in a milieu where the biologically active substance does not lose its characteristic properties, e.g., enzyme activity, ability to specifically bind or inhibit other substances. The reaction is preferably carried out in a buffered aqueous solution. In this context, the term biologically active substances includes enzymes and proteinaceous enzyme inhibitors.

The oxirane-containing polymer can be prepared by treating a hydroxy-containing polymer with non-ion building epoxides (oxiranes) containing at least two strongly reactive groups in the polymer. The chemically reactive product can then be transferred to a milieu suitable for further reaction with the biologically active substances. The course of reaction for a carbohydrate such as agarose, cellulose, etc. with epichlorohydrin and an amino compound in an alkaline milieu can be illustrated by the formula:

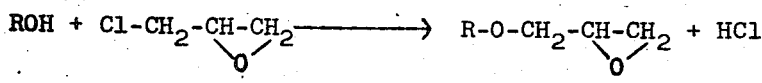

where R represents a carbohydrate, e.g., cellulose, agarose, dextran, etc.

The oxirane-containing polymer can also be prepared by the reaction between an amide-containing polymer, e.g., polyacrylamide or cross-linked polyacrylamide or a derivative thereof and a bifunctional epoxide, e.g., a bis-epoxide.

If the activated polymer is an insoluble, granulated gel, it is washed, preferably on a filter. In a corresponding manner, a soluble polymer is freed from an excess of epichlorohydrin by dialysis.

The biologically active substance is chemically coupled by carrying out, in a suitable buffer milieu, the reaction:

where B represents the biologically active substance, protein or the like.

When coupling to the carboxyl group, the course of reaction for the coupling will instead be

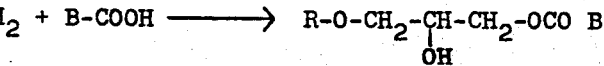

and with a long-chain di-epoxide and amine coupling the final product obtained is:

$$R-O-CH_2-\underset{OH}{CH}-\ldots\ldots\ldots\ldots\underset{OH}{CH}-CH_2-NH\ B$$

For a polyamide, the course of reaction in the coupling of a soluble amine is as follows:

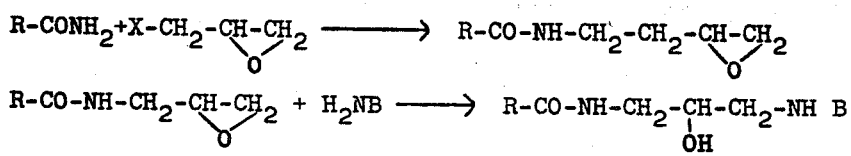

where X is e.g., halogen or an oxirane group and R represents the polymer.

Here, the biologically interesting substance, B, is coupled at the polymer R with a long, hydrophilic, flexible link which does not prevent the biologically important substance to exert its normal reactions against the other biologically important substances, such as bindings of enzyme if B is an inhibitor and the enzyme together with B builds a molecule complex in a free solution. In the case where B is an enzyme, the probability increases that it will retain, even in its coupled state, its strong catalytic effect when the combining segment is long and has hydrophilic characteristics.

The oxirane-containing polymer can also be prepared from polymer containing hydroxyl groups in 1, 2-position, e.g., via tosyl ester and subsequent treatment with sodium methylate.

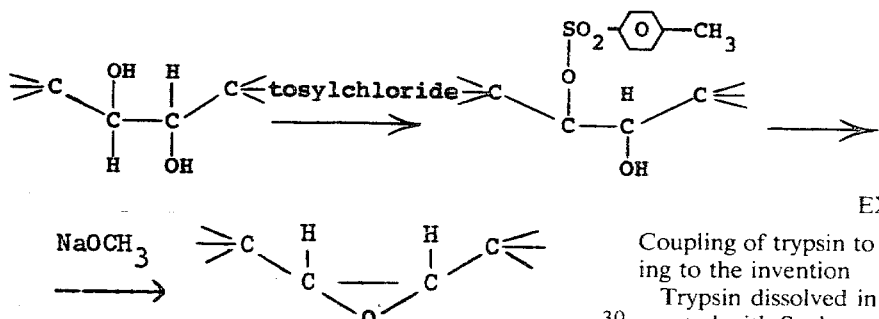

whereafter coupling takes place

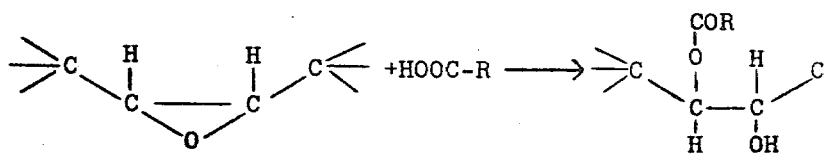

or

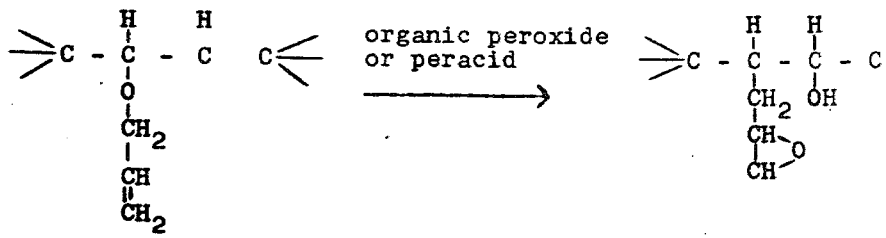

An unsaturated alkylether, e.g. can also be oxidized.

whereafter coupling takes place as above.

In order to further clarify the invention and make it easier to understand, a number of examples and applications will now be cited.

EXAMPLE 1

Activations of Sepharose 6B with epichlorohydrin

Sepharose 6B was washed on a glass filter with distilled water. The withdrawn gel was then transferred to a round-bottomed flask and 1-N NaOH, as well as epichlorohydrin was added. After the activating reaction took place under extremely vigorous stirring for 1 hour at 60°C, the excess epichlorohydrin was washed away with distilled water to a neutral pH. The activated gel could be kept in this milieu at 5°C.

EXAMPLE 2

Coupling of soyabeam-trypsin-inhibitor (STI) to Sepharose 6B activated according to the invention Activated Sepharose 6B buffered with bicarbonate pH 9.5 was reacted with soyabean-trypsin-inhibitor (STI) dissolved in the same buffer. The coupling occured at room temperature under mild stirring and with a reaction time of 20 hours. The product obtained was carefully washed with a coupling buffer, acetate buffer pH 3.0 containing 1-M NaCl, and finally with TRIS buffer pH 7.8.

EXAMPLE 3

Coupling of trypsin to Sepharose 6B activated according to the invention

Trypsin dissolved in bicarbonate buffer pH 9.0 was reacted with Sepharose 6B. Coupling and the washing of the product obtained occurred in the same way as in Example 2.

EXAMPLE 4

Purification of trypsin

A solution of partially purified trypsin was pumped through a column bed consisting of inhibitor agarose (STI coupled to activated Sepharose 6B). The column was then washed with a weak alkaline buffer until there was no longer any UV-adsorbing material obtained in the eluent. By elution of the column with a buffer having an acidic pH, a UV peak (desorption peak) was obtained which was examined to determine the trypsin ac tivity. This was determined with benzoyl arginine-p-nitroanalide (BAPA) as a substrate by measuring the extinction change at 405 nm.

The specific trypsin activity of the desorption peak was 177 percent that of the starting material.

The capacity of the inhibitor-agarose, with regard to the ability to bind the trypsin, was calculated to be about 1 mg. trypsin per ml inhibitor gel.

The experiment reveals that STI coupled to Sepharose with epoxides according to the invention remains active after the coupling — i.e., the inhibitor gel is capable of forming a complex with active trypsin and the complex can then be split to yield the full activity free enzyme.

EXAMPLE 5

Purification of soyabean trypsin-inhibitor

A solution of partially purified trypsin-inhibitor was allowed to pass through a column bed consisting of trypsin coupled to activated Sepharose 6B. After the gel was washed, the bonded inhibitor was eluted with a buffer having an acidic pH. The desorption peak obtained was then examined to determine the trypsin-inhibitor, which was determined by incubating a test solution and trypsin with the subsequent determination of the resulting trypsin activity in the same way as in Example 4.

The obtained desorption peak was shown to have a high trypsin-inhibitor activity. The capacity of the trypsin gel was calculated to be 1 mg STI per 3 ml trypsin gel.

The trypsin bound according to the invention was also shown to retain its activity regarding its ability to build a complex with an active soyabean trypsin-inhibitor. The free trypsin-inhibitor obtained after the splitting of the enzyme inhibitor complex displayed high activity.

EXAMPLE 6

I. Activation of cellulose. II. Coupling of an inhibitor to activated cellulose. III. Adsorption of trypsin to inhibitor cellulose I. Tosyl ester of cellulose was treated with Na-methylate (1 percent Na in methanol) at about −20°C (mixture of ice and common salt) for 1 hr. and 30 min. The product was washed with methanol, water and bicarbonate-buffer having a pH of 8.8.

II. Soyabean trypsin-inhibitor was reacted with cellulose for one whole day at room temperature. the excess inhibitor was washed away with a bicarbonate buffer having a pH of 8.8, an acetate buffer with a pH of 3.0 and finally a bicarbonate buffer with a pH of 7.8.

III. A trypsin preparation was added to the inhibitor-cellulose at pH 7.8. After washing, the enzyme was desorbed from the adsorbent with a buffer in an acid milieu. The enzyme obtained had a high specific activity.

EXAMPLE 7

I. Activation of agarose (sepharose) with epibromohydrin.
II. Coupling of a trypsin inhibitor to activated agarose.
III. Adsorption of trypsin to the inhibitor-agarose.

I. Agarose was suspended in 1 N NaOH and epibromohydrin was added under agitation at 60°C. The reaction time was one hour. The product obtained was washed with water and a coupling buffer.

II. Soyabean trypsin-inhibitor was reacted with the activated agarose for one whole day at room temperature at pH 9.5. The uncoupled inhibitor was washed away with a bicarbonate buffer having a pH of 9.5, an acetate buffer with pH 3.0 and a Tris-buffer with a pH of 7.8.

III. Partially purified trypsin (commercial trypsin) was added to the inhibitor-agarose at pH 7.8. Unadsorbed protein was washed away and adsorbed enzyme was desorbed with an acid pH. The desorbed enzyme contained a specific trypsin activity corresponding to about 2 × the activity of the source material.

1 ml inhibitor-agarose adsorbed 1 mg trypsin which could be regained with retained activity.

EXAMPLE 8

I. Activation of cross-linked polyacrylamide with bis-epoxide.
II. Coupling of trypsin inhibitor to activated gel.
III. Adsorption of trypsin to inhibitor-gel.

I. Cross-linked polyacrylamide balanced with bicarbonate buffer, pH 9.5, was allowed to react with bis-epoxide at room temperature for 20 hours under agitation in a sealed vessel. The product was washed with water and a coupling buffer with a pH of 9.5.

II. Soyabean trypsin-inhibitor was reacted with the activated gel, pH 9.5, for one whole day at room temperature. The uncoupled inhibitor was washed away with bicarbonate buffer having a pH of 9.5, an acetate buffer with a pH of 3.0 and a Tris-buffer with a pH of 7.8.

III. Trypsin was added to the inhibitor-gel at pH 7.8. Unadsorbed enzyme was washed away and adsorbed enzyme was desorbed with an acidic pH. The enzyme obtained was fully active.

10 ml inhibitor-gel adsorbed 400 mg enzyme which could be regained with full retention of activity.

Trypsin and soy bean trypsin inhibitor (STI) are two proteins completely different in amino acid composition, physicochemical and biological properties. Trypsin is composed of 223 amino acid residues, 6 S-S bonds, isoelectric point 10.8. Soy bean trypsin inhibitor has an entirely different amino acid composition, 2 S-S bridges and an isoelectric point of 4.5. The tertiary structures are completely different. These examples demonstrate the versatility of the method for protein coupling in general.

To document the general usefulness of the invention in the following examples, a number of additional enzymes have been linked to the activated Sepharose gel.

EXAMPLE 9

Sepharose 6B from Pharmacia Fine Chemicals AB, Sweden, was activated the same as described in Example 1.

A quantity of activated gel equivalent to 500 mg dried weight was suspended in 50 ml 0.5 M sodium bicarbonate aqueous solution and 100 mg chymotrypsin was added. The reaction occurred at ambient temperature for 16 hours and the product was washed with the following aqueous solutions: 0.1 M sodium borate buffer pH 8.5 and 1 M with regard to sodium chloride during 48 hours, 0.1 M sodium acetate buffer pH 4.1 and 1 M with regard to NaCl during 24 hours and at last with 0.01 M sodium acetate buffer pH 4.1 during 24 hours. The enzyme conjugate was stored in this last buffer at 4°C.

The activity was determined titrimetrically against an 0.01 M solution of N-acetyl-L-tyrosin-ethylester in 0.05 M potassium chloride and which was 5 percent as regards ethanol. The catalyst was added as a suspension which was calibrated as regards the dry weight content of enzyme conjugate. The product had an optimum of 9.3 pH in which the activity was 2 μmol. min$^{-1}$. mg$^{-1}$. The conjugate contained 50 mg protein per g and the activity of the coupled enzyme was approx. 40 μmol.-min.$^{-1}$.mg$^{-1}$, which corresponds to 20 percent of the activity of the soluble enzyme.

The coupling of a further number of enzymes are disclosed in the table below as well as the pH for the coupling, the coupled amount of enzyme in mg/g dried conjugate and the relative activity towards a certain substrate disclosed as percent of the activity of the same amount of the free enzyme in a water solution.

| Example No. | Enzyme | Coupling pH | Coupled amount mg/g dried conjugate | Rel. activity % | Substrate |
|---|---|---|---|---|---|
| 10 | β-amylase | 6.0 | 30 | 40 | Starch |
| 11 | Glucose isomerase | 9.0 | 70 | 25 | Glucose |
| 12 | Ribonuclease | 9.5 | 230 | 35 | Ribonucleic acid |
| 13 | Urokinase | 9.5 | 44 | 35 | Acetyl lysin & methyl ester |

Couplings were made in the same manner of several other inhibitors with varying origin and composition. the oxirane-agarose was produced in the same manner as previously by activation of the commercial product Sepharose 6B. The couplings were carried out at 23°C for 48 hours at a pH of 9.0, 50 mg of inhibitor being reacted with 20 ml sedimented oxirane-Sepharose 6B in 20ml 0.5 M sodium carbonate buffer.

EXAMPLE 14

Coupling of lima bean trypsin inhibitor, LTI. This inhibitor has no connection with trypsin. Rather it is extracted from lima beans, phaseolus lunatus, and has a peptide chain without carbohydrate which is not decomposed by pepsin. The molecular weight is about 9,500 and the isoelectric point 3.6-5.0. It inhibits trypsin, chymotrypsin, plasmin and plasma kallikrein. The results of the coupling of these and the following inhibitors are shown in the table below.

EXAMPLE 15

Ovomucid-trypsin inhibitor, OTI, is extracted from the whites of eggs and has a polypeptide chain with 10-12 percent carbohydrate which is stable in an acid environment but not in alkaline, and is broken down by pepsin. The molecular weight is about 28,800 and the isoelectric point is 3.8-4.5 OTI inhibits trypsin and plasma kallikrein.

EXAMPLE 16

Kallikrein inhibitor, PTI, from bovine pancreas, which is extracted from bovine organs, especially the pancreas and lungs, has a polypeptide chain without carbohydrate and a high stability against pepsin and proteolytic decomposition as well as against acids. The molecular weight is about 6,500 and the isoelectric point 10.0-10.5 PTI inhibits trypsin, chymotrypsin, kallikrein (from plasma, organs, urine) and plasmin.

Table 1

Coupling of enzyme inhibitors to oxirane-agarose.

| Ex. | Inhibitor | Yield mg inhibitor g dry conjugate | Yield μmol. inhibitor g dry conjugate |
|---|---|---|---|
| 14 | Inhibitor from lima beans, LTI | 29 | 3.0 |
| 15 | OTI | 72 | 1.8 |
| 16 | PTI | 29 | 4.5 |
|  | Chymotrypsin inhibitor from potatoes | 25 |  |
|  | Elastase inhibitor from potatoes | 12 |  |

There is also included in the table the results of the coupling of two additional inhibitors, chymotrypsin inhibitor from potatoes and elastase inhibitor from potatoes with the amount coupled given in mg/g dry conjugate.

Having described our invention, we claim:

1. A method for coupling with covalent bonds a water-insoluble polysaccharide gel and an enzyme or a proteinaceous enzyme inhibitor, comprising the steps of introducing an eponide group-containing bifunctional compound selected from the class consisting of epihalohydrin and bisoxirane in the insoluble polysaccharide gel in an alkaline medium by reacting said compound with hydroxy groups of said polysaccharide gel, separating excess said bifunctional compound from said insoluble polysaccharide gel, and contacting the latter with said enzyme or enzyme inhibitor to chemically couple said enzyme or enzyme inhibitor to said polysaccharide gel by reacting a functional group of the enzyme or enzyme inhibitor with epoxide groups of said polysaccharide gel whereby said enzyme or enzyme inhibitor retains its ability to form complexes with natural substances having affinity for said enzyme or enzyme inhibitor in its free form and retains its activity almost completely.

2. A method according to claim 1, in which the polysaccharide is agar.

3. A method according to claim 1, in which the polysaccharide is agarose.

4. A method according to claim 1, in which the polysaccharide is cellulose.

5. A method according to claim 1, in which the polysaccharide is a member selected from the class consisting of dextran and cross-linked dextran.

6. A method according to claim 1, in which said compound is epichlorohydrin.

7. A method according to claim 1, in which said compound is epibromohydrin.

8. A method according to claim 1, in which said compound has the formula

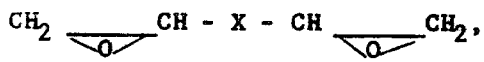

where X is a member selected from the class consisting of [—O(CH$_2$)$_m$]$_p$—O and (CH$_2$)$_n$ in which $m$ is 2-4, $p$ is 1-3 and $n$ is 0.5.

9. A method according to claim 1, in which the coupling is performed in an aqueous medium whose water content is at least 70 percent.

* * * * *